(12) United States Patent
Kusama et al.

(10) Patent No.: US 11,353,332 B2
(45) Date of Patent: Jun. 7, 2022

(54) INFORMATION PROCESSING SYSTEM, STORAGE MEDIUM, AND INFORMATION PROCESSING METHOD

(71) Applicant: TOYOTA JIDOSHA KABUSHIKI KAISHA, Toyota (JP)

(72) Inventors: Eiichi Kusama, Anjo (JP); Masatoshi Hayashi, Nisshin (JP); Hisanori Mitsumoto, Hadano (JP); Kuniaki Jinnai, Nagoya (JP); Makoto Akahane, Shinjuku-ku (JP); Yuriko Yamaguchi, Shibuya-ku (JP); Daisuke Kato, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 261 days.

(21) Appl. No.: 16/675,348

(22) Filed: Nov. 6, 2019

(65) Prior Publication Data
US 2020/0191598 A1   Jun. 18, 2020

(30) Foreign Application Priority Data
Dec. 14, 2018   (JP) .............................. JP2018-234151

(51) Int. Cl.
*G01C 21/36*   (2006.01)
*G08G 1/01*   (2006.01)
*G01C 21/34*   (2006.01)
*G06V 20/56*   (2022.01)

(52) U.S. Cl.
CPC ..... *G01C 21/3647* (2013.01); *G01C 21/3461* (2013.01); *G01C 21/3605* (2013.01); *G06V 20/56* (2022.01); *G08G 1/0133* (2013.01)

(58) Field of Classification Search
CPC ............ G01C 21/3647; G01C 21/3461; G01C 21/3605; G06K 9/00791; G08G 1/0133
See application file for complete search history.

(56) References Cited

U.S. PATENT DOCUMENTS

| | | | | |
|---|---|---|---|---|
| 6,363,161 B2* | 3/2002 | Laumeyer | ............ | G06V 10/443 382/104 |
| 7,688,229 B2* | 3/2010 | Sula | .................... | G01C 21/3647 340/995.13 |
| 8,086,071 B2* | 12/2011 | Chen | ..................... | G06T 15/205 382/284 |

(Continued)

FOREIGN PATENT DOCUMENTS

| | | |
|---|---|---|
| JP | 2003-214868 A | 7/2003 |
| JP | 2013-016004 A | 1/2013 |
| JP | 2016-057284 A | 4/2016 |

*Primary Examiner* — Luis A Martinez Borrero
(74) *Attorney, Agent, or Firm* — Oblon, McClelland, Maier & Neustadt, L.L.P.

(57) ABSTRACT

An information processing system includes one or more vehicles; and a server configured to communicate with the one or more vehicles, wherein each of the one or more vehicles is configured to generate a first video of a traveling route by capturing an outside scene while traveling, and the server is configured to store a plurality of the first videos generated by the one or more vehicles, generate a second video of a specific route using two or more of the first videos, the specific route being different from the traveling route of each of the plurality of the first videos, and send the second video to a terminal device.

21 Claims, 9 Drawing Sheets

(56) References Cited

U.S. PATENT DOCUMENTS

| | | | | |
|---|---|---|---|---|
| 8,531,449 B2* | 9/2013 | Lynch | | G06T 3/4038 |
| | | | | 345/419 |
| 8,595,341 B2* | 11/2013 | McCarthy | | H04N 21/433 |
| | | | | 709/224 |
| 8,838,381 B1* | 9/2014 | Daily | | G01C 21/3647 |
| | | | | 701/428 |
| 9,235,766 B2* | 1/2016 | Li | | H04N 7/185 |
| 9,403,482 B2* | 8/2016 | Shahraray | | H04N 5/44 |
| 10,204,159 B2* | 2/2019 | Angel | | G06V 10/94 |
| 10,375,434 B2* | 8/2019 | Heinz, II | | H04N 21/8146 |
| 10,719,722 B2* | 7/2020 | Molin | | H04N 21/41422 |
| 10,755,121 B2* | 8/2020 | Molin | | H04N 21/4334 |
| 10,846,534 B1* | 11/2020 | Furlan | | G08G 1/017 |
| 2003/0151664 A1* | 8/2003 | Wakimoto | | G01C 21/3602 |
| | | | | 382/104 |
| 2004/0098175 A1* | 5/2004 | Said | | G01C 21/3632 |
| | | | | 701/1 |
| 2007/0093955 A1* | 4/2007 | Hughes | | G01C 21/3647 |
| | | | | 701/421 |
| 2008/0266142 A1* | 10/2008 | Sula | | G01C 21/3647 |
| | | | | 715/726 |
| 2009/0254265 A1* | 10/2009 | Reddy | | G01C 21/3647 |
| | | | | 701/532 |
| 2011/0109543 A1* | 5/2011 | Das | | G06F 3/04845 |
| | | | | 345/156 |
| 2012/0173577 A1* | 7/2012 | Millar | | G06F 16/7837 |
| | | | | 707/E17.014 |
| 2014/0012502 A1* | 1/2014 | Joshi | | G01C 21/3476 |
| | | | | 701/533 |
| 2014/0181259 A1* | 6/2014 | You | | H04L 65/602 |
| | | | | 709/219 |
| 2015/0211879 A1* | 7/2015 | Nomura | | H04W 4/024 |
| | | | | 701/523 |
| 2015/0264416 A1* | 9/2015 | Heinz, II | | H04N 21/23412 |
| | | | | 725/34 |
| 2016/0069703 A1 | 3/2016 | Nakano et al. | | |
| 2016/0214482 A1* | 7/2016 | Kim | | B60K 35/00 |
| 2017/0082451 A1* | 3/2017 | Liu | | G11B 27/031 |
| 2018/0332356 A1* | 11/2018 | Ingah | | H04N 21/4622 |
| 2019/0147258 A1* | 5/2019 | Molin | | G11B 27/329 |
| | | | | 382/104 |
| 2019/0147259 A1* | 5/2019 | Molin | | G06F 16/7844 |
| | | | | 382/104 |
| 2020/0160715 A1* | 5/2020 | Kusama | | G08G 1/166 |
| 2020/0189527 A1* | 6/2020 | Kusama | | B60S 1/0844 |
| 2020/0193810 A1* | 6/2020 | Kusama | | G08G 1/0141 |
| 2020/0372791 A1* | 11/2020 | Li | | G06V 40/172 |
| 2020/0372792 A1* | 11/2020 | Li | | H04W 4/029 |
| 2020/0393267 A1* | 12/2020 | Pandit | | G01C 21/3641 |

\* cited by examiner

FIG. 5

| VIDEO DATA | CAPTURING SITUATION | TRAVELING ROUTE | NODE-PASSING-TIME PLAYBACK POSITION |
|---|---|---|---|
| M1 | * * | A | 00:00 |
| | | B | 01:30 |
| | | C | 03:00 |
| M2 | * * | B | 00:00 |
| | | E | 00:40 |
| | | F | 01:20 |
| . . . | . . . | . . . | . . . |

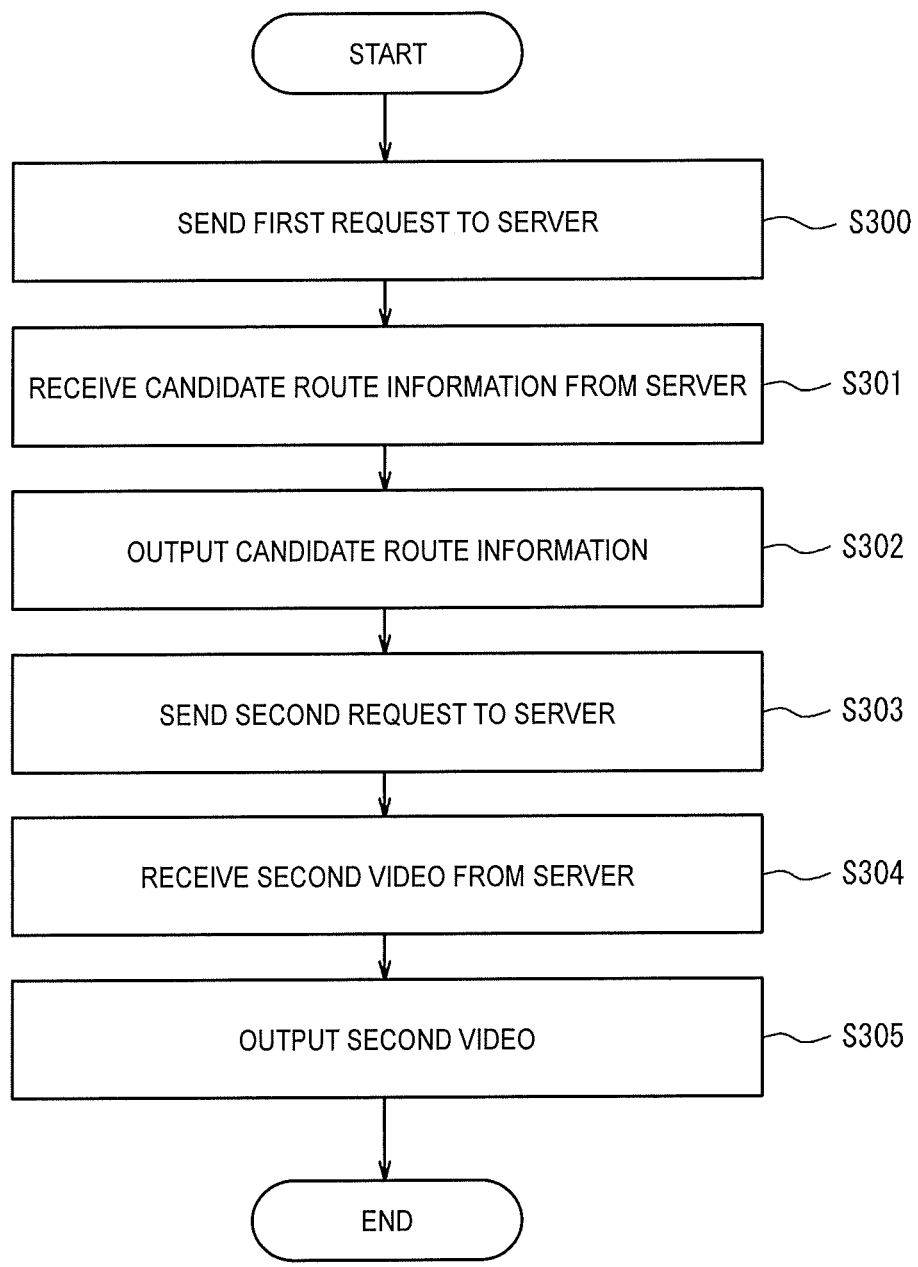

US 11,353,332 B2

INFORMATION PROCESSING SYSTEM, STORAGE MEDIUM, AND INFORMATION PROCESSING METHOD

INCORPORATION BY REFERENCE

The disclosure of Japanese Patent Application No. 2018-234151 filed on Dec. 14, 2018 including the specification, drawings and abstract is incorporated herein by reference in its entirety.

BACKGROUND

1. Technical Field

The present disclosure relates to an information processing system, a storage medium, and an information processing method.

2. Description of Related Art

There is a technique that provides the information on a route from a departure place to a destination. For example, Japanese Patent Application Publication No. 2016-057284 (JP 2016-057284 A) discloses a technique that extracts a plurality of captured images, each corresponding to the capturing point identical or near to each of a plurality of passing points on a user's movement route, from the database and, before the user moves from the departure place to the destination, sequentially displays the plurality of extracted captured images.

SUMMARY

In recent years, a user may wish to confirm a desired route by video. However, according to the technique described above, the video of the route cannot be provided when there is no vehicle that has captured the video of the route while actually traveling the route. Therefore, it is desirable to improve the convenience of the technique for providing the information on a desired route.

The present disclosure improves the convenience of the technique for providing the information on a desired route.

An information processing system according to a first aspect of the present disclosure includes one or more vehicles; and a server configured to communicate with the one or more vehicles, wherein each of the one or more vehicles is configured to generate a first video of a traveling route by capturing an outside scene while traveling, and the server is configured to store a plurality of the first videos generated by the one or more vehicles, generate a second video of a specific route using two or more of the first videos, the specific route being different from the traveling route of each of the plurality of the first videos, and send the second video to a terminal device.

A non-transitory storage medium according to a second aspect of the present disclosure stores a program that causes an information processing device configured to communicate with one or more vehicles to execute storing a plurality of first videos of traveling routes, each of the first videos being generated by capturing an outside scene while each of the one or more vehicles is traveling, generating a second video of a specific route using two or more of the first videos, the specific route being different from the traveling route of each of the plurality of the first videos, and sending the second video to a terminal device.

An information processing method according to a third aspect of the present disclosure is performed by an information processing system including the one or more vehicles and a server configured to communicate with the one or more vehicles. The information processing method includes: generating, by each of the one or more vehicles, a first video of a traveling route by capturing an outside scene while traveling; storing, by the server, a plurality of the first videos generated by the one or more vehicles; generating, by the server, a second video of a specific route using two or more of the first videos, the specific route being different from the traveling route of each of the plurality of the first videos, and sending, by the server, the second video to a terminal device.

According to the information processing system, the program, and the information processing method according to one embodiment of the present disclosure, the convenience of the technique for providing information on a desired route is improved.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is a diagram showing an example of a first video stored in the server;

FIG. 9 is a flowchart showing the operation of the terminal device.

DETAILED DESCRIPTION OF EMBODIMENTS

An embodiment of the present disclosure will be described in detail below.

First Embodiment

Figure 1:
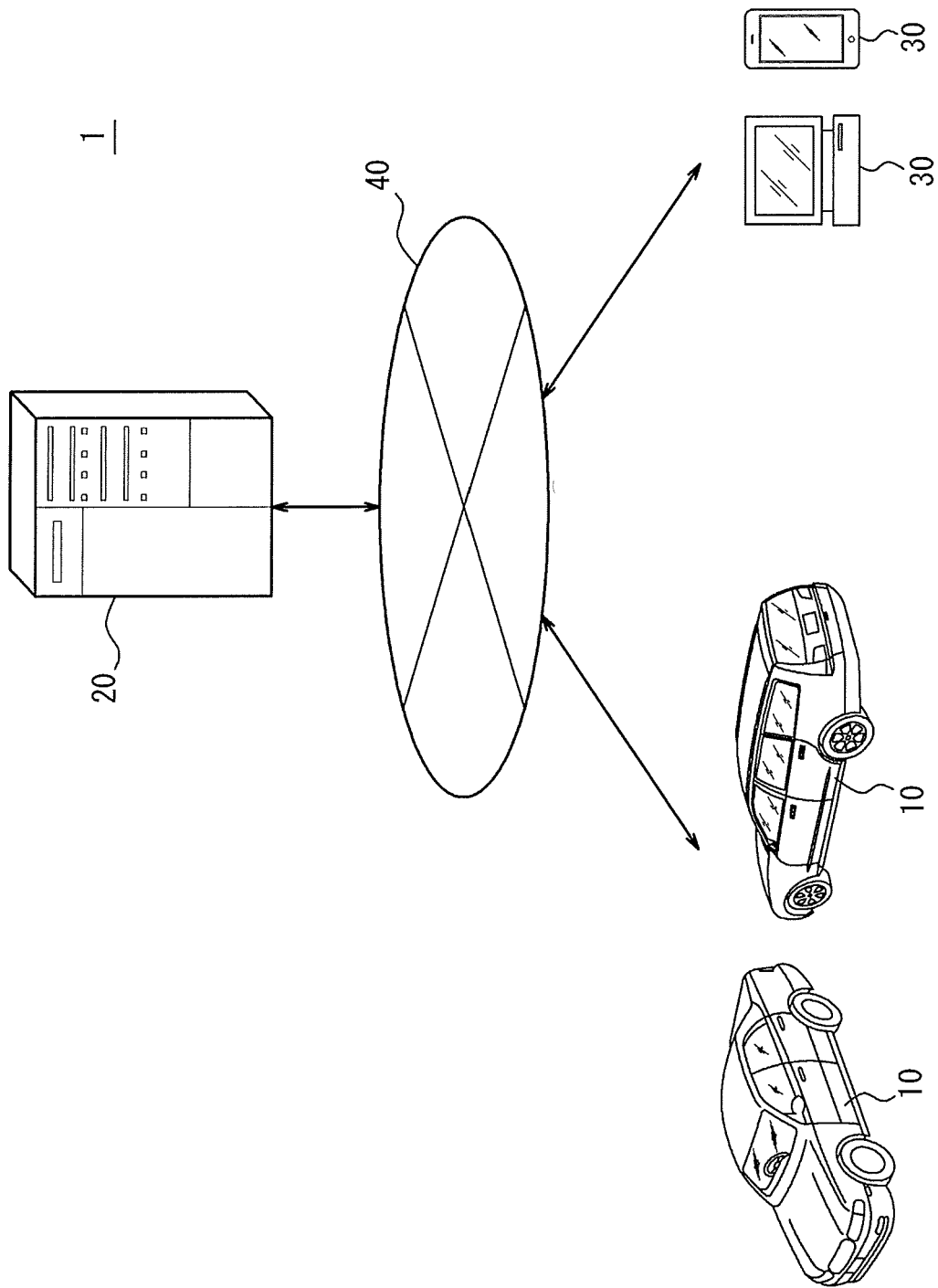
FIG. 1 is a diagram showing a schematic configuration of an information processing system according to an embodiment of the present disclosure.

An overview of an information processing system 1 according to one embodiment of the present disclosure will be described below with reference to FIG. 1. The information processing system 1 includes vehicles 10, a server 20, and terminal devices 30. The vehicle 10 is, but is not limited to, an automobile; that is, the vehicle 10 may be any vehicle. Although only two vehicles 10 are shown in FIG. 1 for ease of description, any number of vehicles 10 may be included in the information processing system 1. The server 20 includes one information processing device or two or more information processing devices (for example, server devices) capable of communicating with each other. The terminal device 30 is, for example, a personal computer (PC), a server device, or a smartphone, but may be any information processing device. Although only two terminal devices 30 are shown in FIG. 1 for ease of description, any number of terminal devices 30 may be included in the information processing system 1. The vehicle 10, server 20, and terminal device 30 can communicate with each other via a network 40 such as a mobile communication network and the Internet.

First, the outline of this embodiment will be described below, and the details will be described later. The vehicle 10, on which an in-vehicle camera is mounted, generates a first video of the traveling route by capturing the outside scene while traveling on the route. In the first video, the roadway, facilities such as a store, street lights, sidewalks, persons such as pedestrians, and other vehicles may be included. In this embodiment, one or more vehicles 10 generates a plurality of first videos of different traveling routes. The server 20 stores the plurality of first videos. When a request is received from the terminal device 30, the server 20 generates the second video of a specific route, which is different from the traveling route of each of the plurality of first videos, using two or more first videos. After that, the server 20 sends the generated second video to the requesting terminal device 30.

Figure 2:
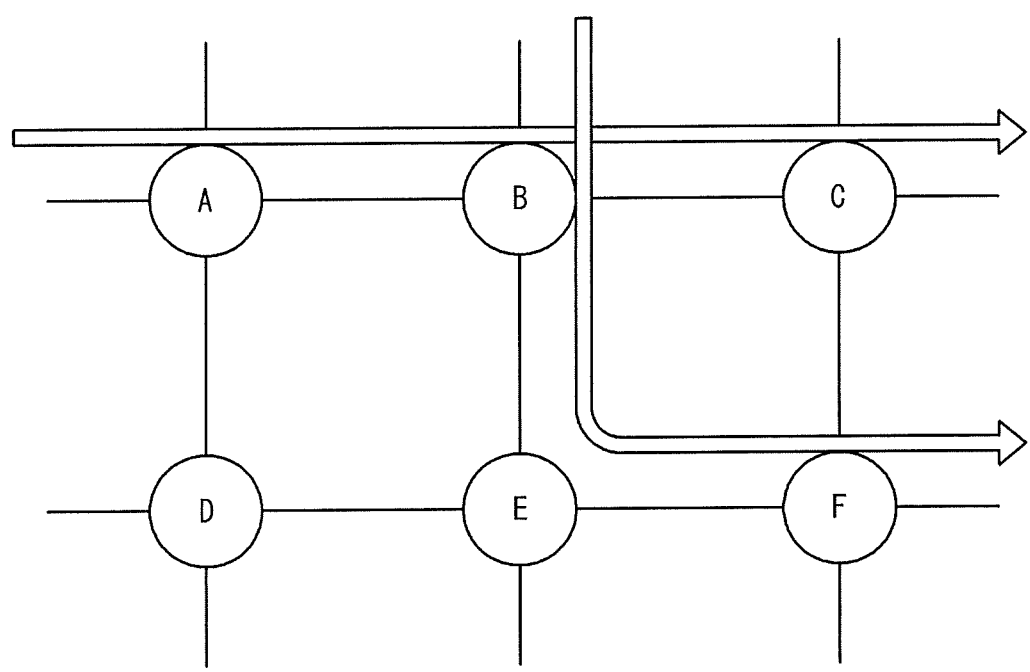
FIG. 2 is a diagram showing an example of nodes and road links on a road map.

With reference to FIG. 2, the method of generating a second video will be described in detail below. FIG. 2 shows an example in which six nodes A to F and the road links, which connect these nodes, are arranged in a grid pattern. For example, when the vehicle 10 sequentially passes through the nodes in the order of nodes A, B, and C while capturing the outside scene, the first video of the traveling route passing through nodes A, B, and C is generated. Similarly, when the vehicle 10 or another vehicle 10 sequentially passes through the nodes in the order of nodes B, E, and F while capturing the outside scene, the first video of the traveling route passing through nodes B, E, and F is generated. Now, consider a specific route that passes through the nodes in the order of nodes A, B, E, and F. In such a case, the second video of the specific route described above can be generated by trimming the part moving from node A to node B from the first first-video and then by combining (concatenating) the trimmed part with the second first video.

In this way, a plurality of first videos is used in this embodiment to generate the second video of a specific route different from each of the traveling routes of the plurality of first videos. For this reason, even if there is no vehicle 10 that actually traveled on the specific route, the second video of the specific route can be provided to the user of the terminal device 30. This method, therefore, improves the convenience of the technique for providing desired route information.

Next, the components of the information processing system 1 will be described in detail below.

Figure 3:
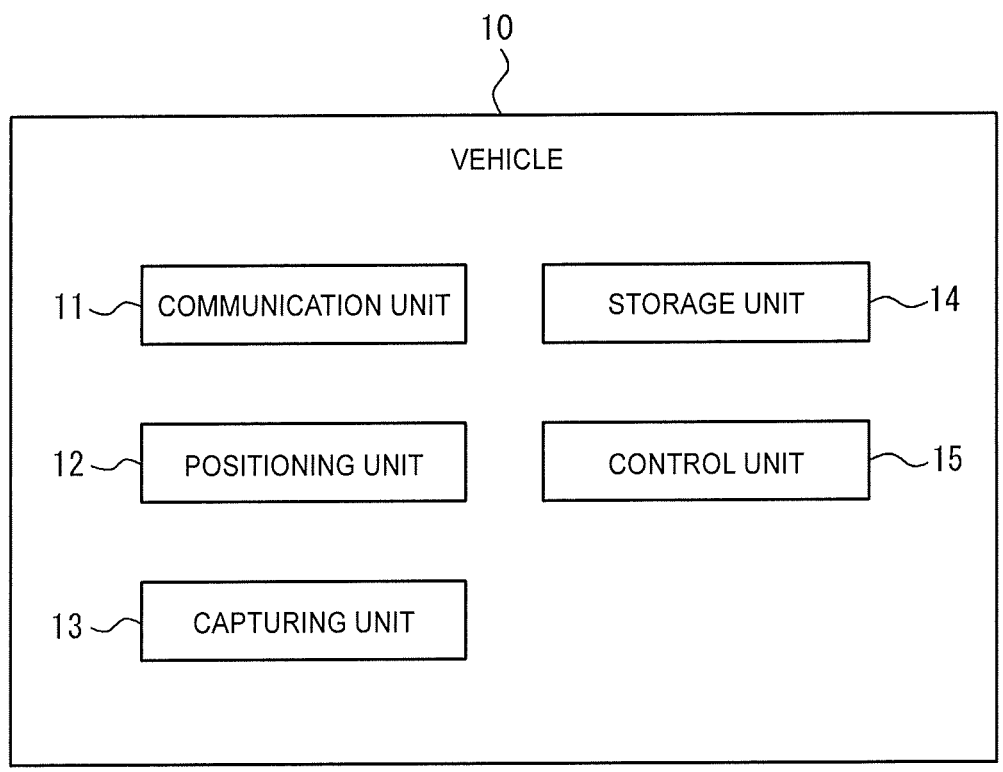
FIG. 3 is a block diagram showing a schematic configuration of a vehicle.

(Configuration of vehicle) As shown in FIG. 3, the vehicle 10 includes a communication unit 11, a positioning unit 12, a capturing unit 13, a storage unit 14, and a control unit 15. Each of the communication unit 11, positioning unit 12, capturing unit 13, storage unit 14, and control unit 15 may be incorporated in the vehicle 10 or may be removably provided in the vehicle 10. The communication unit 11, positioning unit 12, capturing unit 13, storage unit 14, and control unit 15 are communicably connected to each other, for example, via an in-vehicle network such as the controller area network (CAN) or a dedicated line.

The communication unit 11 includes a communication module for connection to the network 40. This communication module conforms to the mobile communication standards such as the 4th generation (4G) and the 5th generation (5G). In addition to these standards, the communication module may conform to any communication standard. For example, an in-vehicle communication device, such as the data communication module (DCM), may function as the communication unit 11. In this embodiment, the vehicle 10 is connected to the network 40 via the communication unit 11.

The positioning unit 12 includes a receiver corresponding to a satellite positioning system. This receiver corresponds to the global positioning system (GPS). In addition to this positioning system, the receiver may correspond to any satellite positioning system. For example, the car navigation device may function as the positioning unit 12. In this embodiment, the vehicle 10 acquires the position information on the vehicle using the positioning unit 12.

The capturing unit 13 includes an in-vehicle camera that generates a video obtained by capturing an object in the field of view. This in-vehicle camera may be a monocular camera or a stereo camera. The capturing unit 13 is provided in the vehicle 10 so as to be able to capture the outside scene. For example, a drive recorder or an electronic device having the camera function, such as a smartphone used by an occupant, may function as the capturing unit 13. In this embodiment, the vehicle 10 uses the capturing unit 13 to generate the first video of a traveling route by capturing the outside scene while traveling on the route.

The storage unit 14 includes one or more memories. In this embodiment, the "memory" is, but is not limited to, a semiconductor memory, a magnetic memory, or an optical memory. Each memory included in the storage unit 14 may function as a main storage device, an auxiliary storage device, or a cache memory. The storage unit 14 stores any information used for the operation of the vehicle 10. For example, the storage unit 14 may store system programs, application programs, embedded software, and road map information. The road map information may include the identification information and the position information on the nodes and the road links. For example, based on a comparison between the temporarily changing position information, acquired by the positioning unit 12, and the road map information, the nodes and the road links through which the vehicle 10 has passed can be detected. The information stored in the storage unit 14 is updatable, for example, with the information acquired from the network 40 via the communication unit 11.

The control unit 15 includes one or more processors. In this embodiment, the "processor" includes, but is not limited to, a general-purpose processor and a dedicated processor specialized for specific processing. For example, an electronic control unit (ECU) mounted on the vehicle 10 may function as the control unit 15. The control unit 15 controls the overall operation of the vehicle 10.

For example, the control unit 15 generates the first video of a traveling route by using the capturing unit 13 to capture the outside scene while the vehicle 10 is traveling on the traveling route. While capturing the first video, the control unit 15 compares the temporarily changing position information, obtained by the positioning unit 12, and the road map information stored in the storage unit 14. Based on this comparison, the control unit 15 detects the traveling route of the vehicle 10 and the passage of the vehicle 10 through nodes or road links. The control unit 15 detects the playback position of the video data corresponding to the time at which the vehicle 10 passed through each node on the traveling route (hereinafter also referred to as "node-passage-time playback position") and stores the detected playback position in the storage unit 14. The playback position refers to a position (in minutes and seconds) on a bar, for example at the bottom of the screen, to show the amount of video that has been played back so far.

In addition, the control unit 15 acquires the information indicating the capturing situation that was present when the first video was captured. The "capturing situation" may include at least one of the time zone, the season, the weather, the speed of the vehicle 10, the congestion degree of the roadway, and the congestion degree of the sidewalk at the time of capturing. However, the capturing situation includes, but is not limited to, the examples given above; that is the capturing situation may include any situation at the time of capturing. Any method may be used for acquiring the information that indicates the capturing situation. For example, the time zone and the season at the time of capturing may be acquired based on the system time. The weather at the time of capturing may be acquired from the first video through image recognition, or may be acquired from the network 40 via the communication unit 11. The speed of the vehicle 10 at the time of capturing may be acquired from the speed sensor mounted on the vehicle 10. The degree of congestion of the roadway and the degree of congestion of the sidewalk at the time of capturing may be acquired from the first video through image recognition.

In addition, the control unit 15 sends the generated first video to the server 20 via the communication unit 11. The first video that is sent includes not only the video data but also, as the metadata, the information indicating the capturing situation, traveling route, and node-passage-time playback position (see FIG. 5). In this embodiment, a traveling route is represented by the information indicating the nodes in the order in which the vehicle 10 has passed through while capturing the first video. Note that, however, a traveling route need not always be represented in this form but may be represented in any other form. For example, a traveling route may be represented by the position information on the vehicle 10 in the form of time-series data or by the information indicating the road links in the order in which the vehicle 10 has passed.

Figure 4:
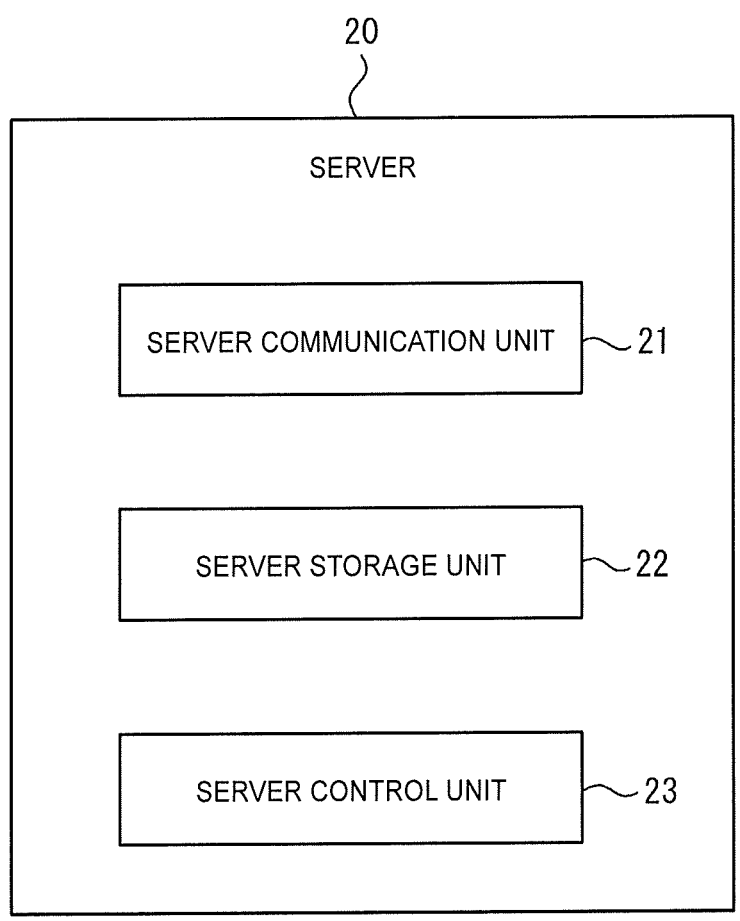
FIG. 4 is a block diagram showing a schematic configuration of a server.

(Configuration of server) As shown in FIG. 4, the server 20 includes a server communication unit 21, a server storage unit 22, and a server control unit 23.

The server communication unit 21 includes a communication module for connection to the network 40. This communication module conforms to the wired local area network (LAN) standard. In addition to this standard, the communication module may conform to any communication standard. In this embodiment, the server 20 is connected to the network 40 via the server communication unit 21.

The server storage unit 22 includes one or more memories. Each memory included in the server storage unit 22 may function, for example, as a main storage device, an auxiliary storage device, or a cache memory. The server storage unit 22 stores any information used for the operation of the server 20. For example, the server storage unit 22 may store system programs, application programs, databases, and map information. The map information may include the information indicating the names, types, and positions of the facilities present on the map and the information indicating the position of the streetlights. The information stored in the server storage unit 22 may be updatable, for example, with the information acquired from the network 40 via the server communication unit 21.

The server control unit 23 includes one or more processors. The server control unit 23 controls the overall operation of the server 20. For example, the server control unit 23 receives a plurality of first videos, generated by the one or more vehicles 10, via the server communication unit 21 and stores the received first videos in the server storage unit 22. As described above, a first video received from the vehicle 10 includes not only the video data but also the information indicating the capturing situation, the traveling route, and the node-passage-time playback position. Therefore, as shown in FIG. 5, the video data, capturing situation, traveling route, and node-passage-time playback position are stored in the server storage unit 22. FIG. 5 shows two first videos stored in the server storage unit 22. More specifically, the first first-video includes video data M1 of the traveling route passing through nodes in the order of A, B, and C, the corresponding capturing situation, and the corresponding node-passage-time playback positions. In video data M1, the node A passage-time playback position is 00:00, the node B passage-time playback position is 01:30, and the node C passage-time playback position is 03:00. Similarly, the second first video includes video data M2 of the traveling route passing through nodes in the order of B, E, and F, the corresponding capturing situation, and the corresponding node-passage-time playback positions. In video data M2, node B passage-time playback position is 00:00, node E passage-time playback position is 00:40, and node F passage-time playback position is 01:20.

In addition, when a first request, which specifies a departure place and a destination, is received from the terminal device 30 via the server communication unit 21, the server control unit 23 determines a plurality of different candidate routes from the departure place to the destination. When the first request further specifies one or more waypoints, the server control unit 23 may determine a plurality of candidate routes that pass through one or more of the waypoints. An upper limit may be set for the number of candidate routes that are determined. When an upper limit is set, the server control unit 23 may preferentially determine, from among many candidate routes from the departure place to the destination, candidate routes that satisfy the predetermined criteria (for example, with priority given to a route with a short travel distance) up to the upper limit. Note that, in this embodiment, it is assumed that a candidate route determined by the server control unit 23 is different from the traveling route of each of the plurality of first videos stored in the server storage unit 22.

In addition, the server control unit 23 acquires the attribute information indicating the attribute of each candidate route. The "attribute of a route" may include at least one of the type of facilities (for example, convenience store, post office, etc.) and number of facilities along the route, the presence or absence of streetlights, and the type and number of crimes that occurred on the route. However, the attribute of a route is not limited to the above examples but may include any attribute related to the route. Any method may be used to acquire the attribute information on a candidate route. For example, the type and number of facilities and the presence or absence of streetlights may be acquired, through image recognition, from the first video that is common to both at least a part of the traveling route and the candidate route, may be acquired based on a comparison between the candidate route and the map information stored in the server storage unit 22, or may be acquired from the network 40 via the server communication unit 21. The type and number of crimes may be acquired based on a comparison between the candidate route and the crime information map. The crime information map, which is map data including the position at which a crime occurred and the type of the crime, can be acquired from an administrative agency, such as the police, via the network 40.

In addition, the server control unit 23 sends the candidate route information, which indicates a plurality of candidate routes, to the terminal device 30 via the server communication unit 21. The candidate route information may include the attribute information on the candidate routes. The candidate route information may also include the information that identifies a recommended route which is one of the plurality of candidate routes and whose attribute satisfies a predetermined criterion (for example, a candidate route with the smallest number of crimes). As will be described later, the candidate route information, which is sent to the terminal device 30, is output by the terminal device 30 for presentation to the user of the terminal device 30.

In addition, when a second request, which specifies one candidate route selected from a plurality of candidate routes, is received from the terminal device 30 via the server communication unit 21, the server control unit 23 determines the selected one candidate route as a specific route. As described above, the specific route (i.e., one selected candidate route) is different from each of the traveling routes of the plurality of first videos stored in the server storage unit 22. This means that the server storage unit 22 does not store the first video of a traveling route identical to the specific route. Therefore, the server control unit 23 generates the second video of the specific route using two or more of the first videos. For example, the server control unit 23 may generate the second video by combining at least a part of each of the two or more of the first videos.

The method of generating the second video of a specific route will be described in detail below. For example, assume that the server storage unit 22 stores at least the following two first videos as shown in FIG. 5: one is the first video (hereinafter also referred to as "first video ABC") of the traveling route passing through the nodes in the order of nodes A, B, and C, and the other is the first video (hereinafter also referred to as "first video BEF") of the traveling route passing through the nodes in the order of nodes B, E, and F. Also, assume that the specific route is a route passing through the nodes in the order of nodes A, B, E, and F. In such a case, the server control unit 23 trims the part from node A to node B of video data M1 of the first video ABC (in the example shown in FIG. 5, the part corresponding to the playback position from 00:00 to 01:30 of the video data M1). Then, the server control unit 23 combines the part, trimmed from the video data M1 of the first video ABC, and the video data M2 of the first video BEF to generate the second video of the specific route that sequentially passes through nodes A, B, E, and F.

When generating a second video, the server control unit 23 may preferentially select, from among the plurality of first videos stored in the server storage unit 22, two or more of the first videos having a similar capturing situation and, using the two or more of the first videos selected in this way, generate the second video. Such a configuration improves the visibility of the second video as described below.

For example, assume that the capturing situation of the first video ABC indicates that the time zone is "day" and that the capturing situation of the first video BEF indicates that the time zone is "night". In such a case, when the second video of the specific route is generated using the first video ABC and the first video BEF as described above, the time zone changes from day to night at the time of passage through node B during the playback of the second video. When a second video is generated using two or more of the first videos that are different in the capturing situation in this way, the capturing situation may unnaturally change during the playback of the second video. In this case, the visibility of the second video generated is not necessarily high. On the other hand, assume that another first video (hereinafter also referred to as "first video AB") passing through the nodes in the order of nodes A and B is stored in the server storage unit 22 and the capturing situation of the first video AB indicates that the time zone is "night". In such a case, when a second video is generated using the first video AB and the first video BEF both of which have the capturing situation indicating that the time zone is "night", the time zone does not change at the time of the passage through node B during the playback of the second video. Generating a second video by preferentially using two or more of the first videos having a similar capturing situation in this way will reduce the probability that the capturing situation unnaturally changes during the playback of the second video. Therefore, the visibility of the second video can be improved.

In addition, the server control unit 23 sends the second video, generated as described above, to the terminal device 30 via the server communication unit 21. The second video may be sent in either download format or streaming format.

Figure 6:
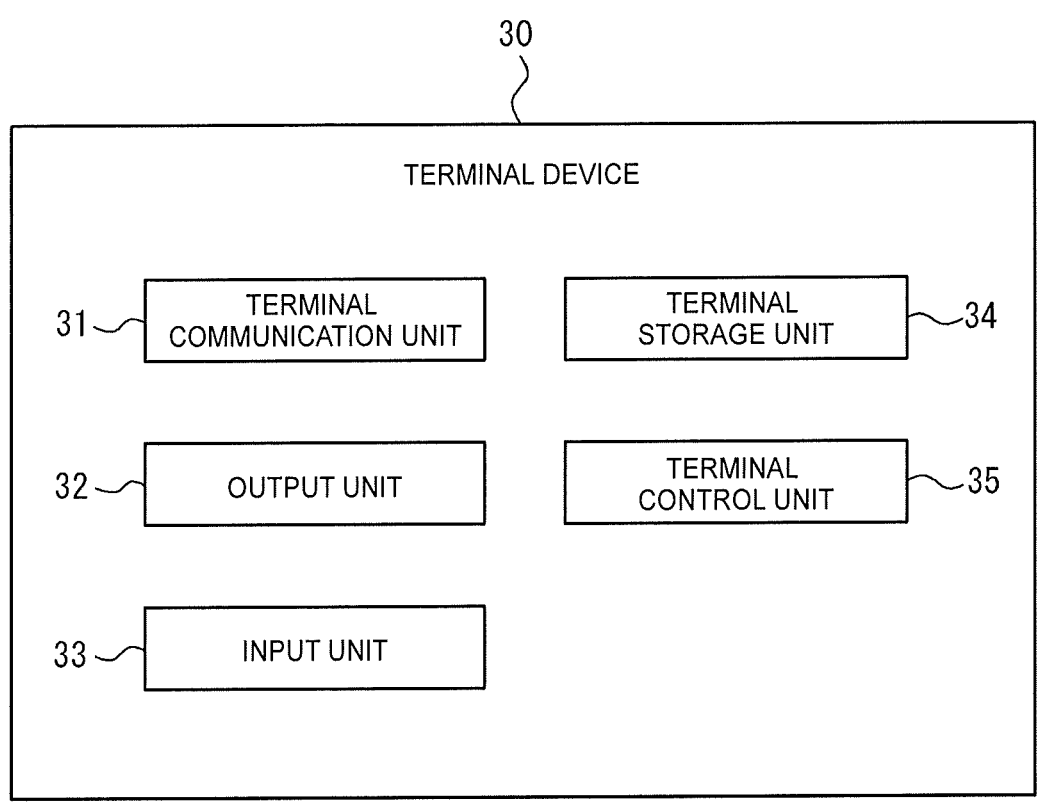
FIG. 6 is a block diagram showing a schematic configuration of a terminal device.

(Configuration of terminal device) As shown in FIG. 6, the terminal device 30 includes a terminal communication unit 31, an output unit 32, an input unit 33, a terminal storage unit 34, and a terminal control unit 35.

The terminal communication unit 31 includes a communication module for connection to the network 40. This communication module conforms to the mobile communication standard, the wired LAN standard, or a wireless LAN standard. In addition to these standards, the communication module may conform to any communication standard. In this embodiment, the terminal device 30 is connected to the network 40 via the terminal communication unit 31.

The output unit 32 includes one or more output interfaces that output information to notify the user. For example, the output interface included in the output unit 32 includes, but is not limited to, a display that outputs information as an image or a speaker that outputs information as a voice.

The input unit 33 includes one or more input interfaces for detecting a user input. For example, the input interface included in the input unit 33 includes, but is not limited to, a physical key, a capacitance key, a touch screen integrally provided with the display of the output unit 32, or a microphone that receives a voice input.

The terminal storage unit 34 includes one or more memories. Each memory included in the terminal storage unit 34 may function, for example, as a main storage device, an auxiliary storage device, or a cache memory. The terminal storage unit 34 stores any information used for the operation of the terminal device 30. For example, the terminal storage unit 34 may store system programs and application programs. The information stored in the terminal storage unit 34 may be updatable, for example, with the information acquired from the network 40 via the terminal communication unit 31.

The terminal control unit 35 includes one or more processors. The terminal control unit 35 controls the overall operation of the terminal device 30. For example, the terminal control unit 35 accepts a specification of a departure place and a destination either when the user enters a request or automatically. The terminal control unit 35 sends a first request, which includes a specification of a departure place and a destination, to the server 20 via the terminal communication unit 31. At this time, the terminal control unit 35 may further accept a specification of one or more waypoints either when the user enters them or automatically. In such a case, the first request further includes a specification of one or more waypoints.

In addition, the terminal control unit 35 receives the candidate route information, sent from the server 20 in response to the first request, via the terminal communication unit 31. The terminal control unit 35 outputs the candidate route information via the output unit 32 for presentation to the user. The user can confirm this candidate route information and, from among the plurality of candidate routes included in this information, select a candidate route that the user wishes to confirm by displaying its video. When the information indicating a recommended route is included in the candidate route information as described above, the terminal control unit 35 may present the candidate route, specified as the recommended route, to the user in preference to other candidate routes.

In addition, when the user selects one candidate route, the terminal control unit 35 accepts the specification of one candidate route that is one of the plurality of candidate routes included in the candidate route information. The terminal control unit 35 sends a second request, which includes the specification of the one candidate route, to the server 20 via the terminal communication unit 31. As described above, the candidate route specified by the second request is set as the specific route in the server 20.

In addition, the terminal control unit 35 receives, via the terminal communication unit 31, the second video of the specific route that is sent from the server 20 in response to the second request. The terminal control unit 35 outputs the second video via the output unit 32 for presentation to the user.

Figure 7:
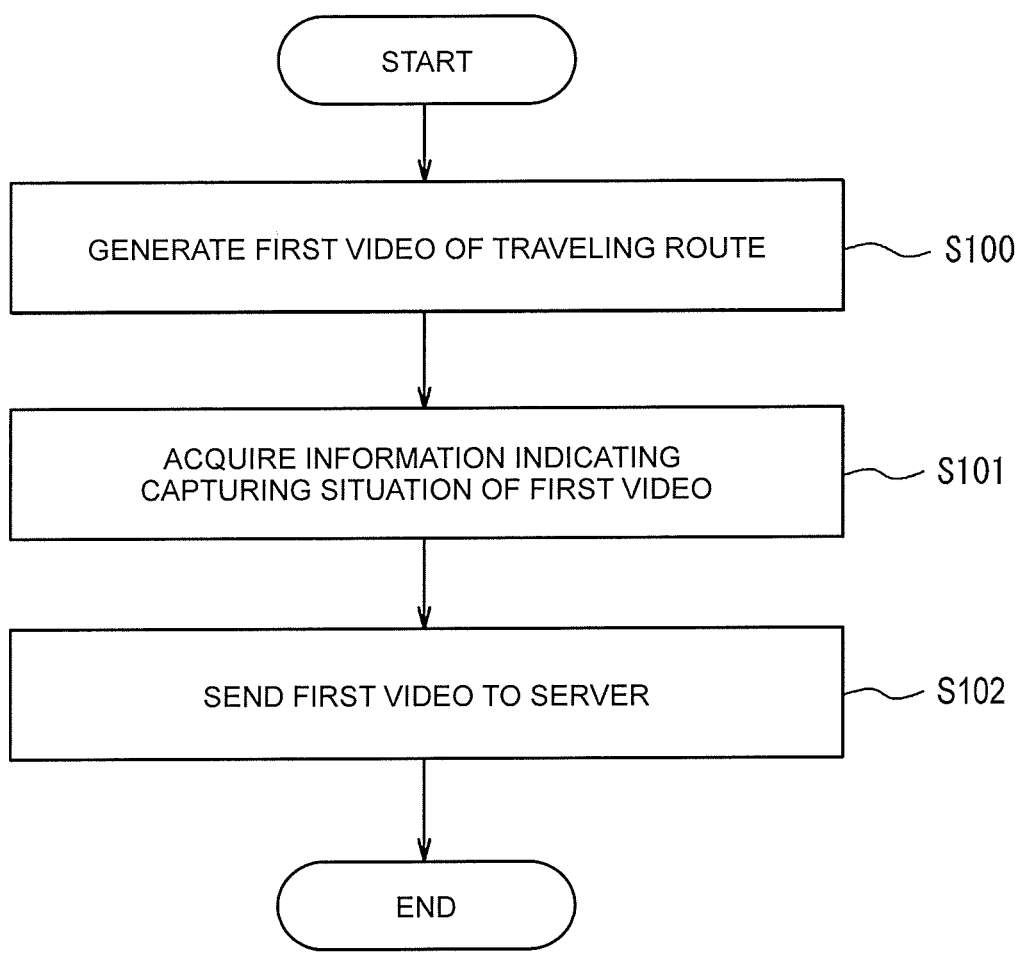
FIG. 7 is a flowchart showing the operation of the vehicle.

(Operation flow of vehicle) The operation flow of the vehicle 10 will be described below with reference to FIG. 7.

Step S100: The control unit 15 generates the first video of the traveling route by capturing the outside scene using the capturing unit 13 while the vehicle 10 is traveling.

Step S101: The control unit 15 acquires the information indicating the capturing situation at the time of capturing of the first video. As described above, the capturing situation includes at least one of the time zone, season, weather, speed of the vehicle 10, degree of roadway congestion, and degree of sidewalk congestion at the time of capturing.

Step S102: The control unit 15 sends the first video to the server 20 via the communication unit 11. The first video that is sent includes not only the video data but also, as the metadata, the information indicating the capturing situation, traveling route, and node-passage-time playback position.

Figure 8:
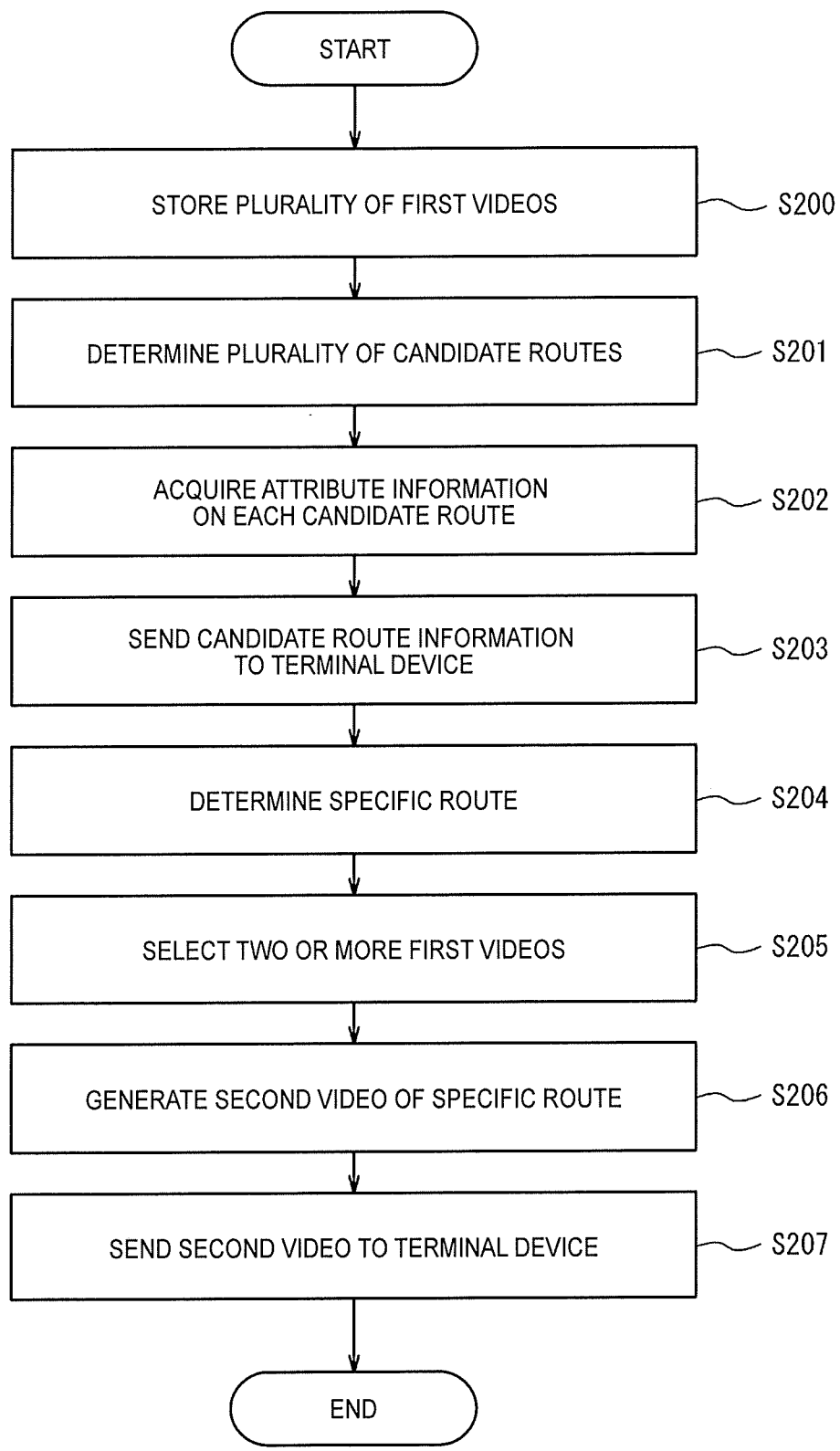
FIG. 8 is a flowchart showing the operation of the server.

(Operation flow of server) The operation flow of the server 20 will be described below with reference to FIG. 8.

Step S200: The server control unit 23 receives a plurality of first videos, generated by the one or more the vehicles 10, via the server communication unit 21 and stores the received first videos in the server storage unit 22.

Step S201: When a first request, which includes a specification of a departure place and a destination, is received from the terminal device 30 via the server communication unit 21, the server control unit 23 determines a plurality of different candidate routes from the departure place to the destination. When the first request further includes a specification of one or more waypoints, the server control unit 23 may determine a plurality of candidate routes so as to pass through the specified one or more waypoints.

Step S202: The server control unit 23 acquires the attribute information indicating the attribute of each candidate route. As described above, the attribute of a candidate route includes, but is not limited to, at least one of the type and number of facilities along the candidate route, the presence or absence of a streetlight, and the type and number of crimes that occurred on the route.

Step S203: The server control unit 23 sends candidate route information, which indicates the plurality of candidate routes, to the terminal device 30 via the server communication unit 21. As described above, the candidate route information includes the attribute information on each candidate route.

Step S204: When a second request, which includes a specification of one candidate route selected from the plurality of candidate routes, is received from the terminal device 30 via the server communication unit 21, the server control unit 23 determines the specified one candidate route as the specific route. As described above, the specific route (i.e., one selected candidate route) is different from the traveling route of each of the plurality of first videos stored in the server storage unit 22.

Step S205: The server control unit 23 selects, from among the plurality of first videos stored in the server storage unit 22, two or more first videos to be used to generate the second video of the specific route. In this case, the server control unit 23 may preferentially select two or more first videos having a similar capturing situation.

Step S206: The server control unit 23 generates the second video of the specific route using two or more first videos. For example, the server control unit 23 may generate the second video by combining at least a part of each of two or more first videos.

Step S207: The server control unit 23 sends the second video, generated as described above, to the terminal device 30 via the server communication unit 21.

(Operation flow of terminal device) The operation flow of the terminal device 30 will be described below with reference to FIG. 9.

Step S300: The terminal control unit 35 sends a first request, which includes a specification of the departure place and the destination, to the server 20 via the terminal communication unit 31.

Step S301: The terminal control unit 35 receives candidate route information, which is sent from the server 20 in response to the first request, via the terminal communication unit 31.

Step S302: The terminal control unit 35 outputs the candidate route information via the output unit 32 for presentation to the user.

Step S303: The terminal control unit 35 sends a second request, which includes a specification of one of the plurality of candidate routes indicated by the candidate route information, to the server 20 via the terminal communication unit 31.

Step S304: The terminal control unit 35 receives the second video of the specific route, which is sent from the server 20 in response to the second request, via the terminal communication unit 31.

Step S305: The terminal control unit 35 outputs the second video via the output unit 32 for presentation to the user.

As described above, in the information processing system 1 according to this embodiment, one or more vehicles 10 each generate the first video of the traveling route. The server 20 stores a plurality of first videos generated by one or more vehicles 10. Then, the server 20 generates the second video of a specific route, which is different from the traveling route of each of the plurality of first videos, using two or more first videos and sends the generated second video to the terminal device 30. This configuration allows the second video of a specific route to be provided to the user of the terminal device 30 even if there is no vehicle 10 that actually traveled on the specific route. Therefore, the convenience of the technique for providing desired route information is improved.

Although the present disclosure has been described with reference to the drawings and embodiments, it should be noted that those skilled in the art can easily make various changes and modifications based on the present disclosure. Therefore, it is to be noted that these changes and modifications are within the scope of the present disclosure. For example, it is possible to relocate the functions included in each unit or each step in such a way that they are not logically contradictory, and it is possible to combine a plurality of units or steps into one or to divide them.

For example, in the embodiment described above, some processing operations performed by the vehicle 10 may be performed by the server 20, and some processing operations performed by the server 20 may be performed by the vehicle 10. For example, it is also possible to configure the information processing system 1 in such a way that the information indicating the capturing situation of a first video is acquired, not by the vehicle 10, but by the server 20.

In the embodiment described above, the server control unit 23 is configured to preferentially select, from among a plurality of first videos stored in the server storage unit 22, two or more first videos having a similar capturing situation. Then, using the two or more first videos selected in this way, the server control unit 23 generates a second video. Instead of this configuration, the capturing situation of the first videos to be preferentially selected may be specified by the terminal device 30. For example, the terminal control unit 35 accepts a specification of the capturing situation either when the user specifies the capturing situation or automatically. The terminal control unit 35 sends a third request, which includes the specification of the capturing situation, to the server 20 via the terminal communication unit 31. The third request is sent to the server 20, for example, at the same time the second request is sent; instead, the third request may be sent at another time. When the second request and the third request are received via the server communication unit 21, the server control unit 23 determines one candidate route, specified in the second request, as the specific route. At the same time, from the plurality of first videos stored in the server storage unit 22, the server control unit 23 selects two or more first videos to be used for generating the second video of the specific route. At this time, the server control unit 23 preferentially selects, from among the plurality of first videos, two or more first videos having a capturing situation similar to that specified by the third request. Then, the server control unit 23 generates a second video using the selected two or more first videos. This configuration allows the user to confirm the specific route using the video corresponding to the desired capturing situation. This ability further improves the convenience of the technique for providing desired route information. In addition to the configuration described above, the first video's capturing situation to be preferentially selected may be specified, not by the terminal device 30, but automatically by the server 20. The capturing situation specified by the server 20 may be predetermined.

In the embodiment described above, the capturing situation of the first video of a traveling route may include the congestion degree of a roadway and/or a sidewalk (hereinafter also referred to as the congestion degree of a traveling route). When a plurality of first videos is stored for one traveling route in the server storage unit 22, the server control unit 23 may calculate the average value of the congestion degrees of the traveling route (hereinafter also referred to as the average degree of congestion) by referring to the capturing situation of the plurality of first videos. Then, when one of the plurality of first videos is used for generating the second video of the specific route, the server control unit 23 may preferentially select, from among the plurality of first videos, the first video having a congestion degree closest to the average degree pf congestion. Such a configuration reduces the probability that the first video that was generated when the congestion degree of the traveling route was different from that at the normal time (for example, the congestion degree was temporarily high due to an event such as a motor show) will be used for the generation of the second video. Therefore, this configuration reduces the probability that the user who has browsed the second video may misunderstand the degree of congestion at the usual time of the traveling route, further improving the convenience of the technique for providing the desired route information.

In the embodiment described above, the capturing situation of the first video of a traveling route may include the speed of the vehicle 10 at the capturing time of the first video. Note that, after selecting two or more first videos for generating the second video of a specific route, the server control unit 23 may adjust the playback speed of at least one of the two or more first videos by performing the video editing processing. For example, assume that, when two first videos are selected, the speed of the vehicle 10 at the time of capturing of the first first-video is 35 km/h and that the speed of the vehicle 10 at the time of capturing of the second first-video is 70 km/h. In such a case, the server control unit 23 edits the playback speed in such a way that the playback speed of the first first-video becomes 2× (70 [km/h]/35 [km/h]=2) or that the playback speed of the second first-video becomes 0.5× (35 [km/h]/70 [km/h]=0.5). After editing the speed of the vehicle 10, the server control unit 23 combines the two first videos to generate a second video. This configuration reduces the probability that the speed of the vehicle 10 unnaturally changes during the playback of the second video even if the speeds of two or more of the first videos, which will be used to generate the second video, are different. Therefore, this configuration further improves the visibility of the second video.

It is also possible to allow a general-purpose information processing device, such as a computer, to function as the components of the vehicle 10, as the server 20, or as the terminal device 30 in the embodiment described above. More specifically, a program describing the processing for implementing the functions of the server 20 and other devices in the embodiment is stored in the memory of the information processing device so that the processor of the information processing device can read this program for execution. Therefore, the disclosure in this embodiment may be implemented also as a program executable by the processor.

What is claimed is:

1. An information processing system comprising:
one or more vehicles; and
a server configured to communicate with the one or more vehicles, wherein
each of the one or more vehicles is configured to generate a first video of a traveling route by capturing an outside scene while traveling, and
the server is configured to
store a plurality of the first videos generated by the one or more vehicles,
generate a second video of a specific route using two or more of the first videos by (i) configuring playback speeds of the first videos such that vehicle speed information of the first videos to be combined is the same, and (ii) combining at least a part of each of the two or more of the first videos, the specific route being different from the traveling route of each of the plurality of the first videos, and send the second video to a terminal device, wherein at least one of the one or more vehicles or the server is configured to acquire information indicating a capturing situation at a time of capturing of the first video, the capturing situation includes at least one of a congestion degree of a roadway and a congestion degree of a sidewalk, and the terminal device is configured to receive the second video and display the second video via a display device to a user.

2. The information processing system according to claim 1, wherein the server is configured to generate the second video by combining at least a part of each of the two or more of the first videos.

3. The information processing system according to claim 1, wherein at least one of the vehicle or the server is configured to acquire information indicating a capturing situation at a time of capturing of the first video, and the server is configured to preferentially select two or more of the first videos having a similar capturing situation from the plurality of the first videos, and generate the second video using the selected two or more of the first videos.

4. The information processing system according to claim 3, wherein the capturing situation further includes at least one of a time zone, a season, weather, and a speed of the vehicle at the time of capturing.

5. The information processing system according to claim 1, wherein the server is configured to determine a plurality of candidate routes from a departure place to a destination, the plurality of candidate routes being different each other, send candidate route information to the terminal device, the candidate route information indicating the plurality of the candidate routes, and when a request including a specification of one of the candidate routes selected from the plurality of candidate routes is received from the terminal device, determine the one of the candidate routes as the specific route.

6. The information processing system according to claim 5, wherein the candidate route information includes attribute information indicating an attribute of each of the candidate routes.

7. The information processing system according to claim 6, wherein the attribute of the candidate route includes at least one of a type and number of facilities along the candidate route, presence or absence of a street light, and a type and number of crimes that occurred on the candidate route.

8. A non-transitory computer-readable storage medium storing a program, wherein the program causes an information processing device configured to communicate with one or more vehicles to execute storing a plurality of first videos of traveling routes, each of the first videos being generated by capturing an outside scene while each of the one or more vehicles is traveling, generating a second video of a specific route using two or more of the first videos by (i) configuring playback speeds of the first videos such that vehicle speed information of the first videos to be combined is the same, and (ii) combining at least a part of each of the two or more of the first videos, the specific route being different from the traveling route of each of the plurality of the first videos, and sending the second video to a terminal device, wherein at least one of the one or more vehicles or a server is configured to acquire information indicating a capturing situation at a time of capturing of the first video, the capturing situation includes at least one of a congestion degree of a roadway and a congestion degree of a sidewalk, and the terminal device is configured to receive the second video and display the second video via a display device to a user.

9. The non-transitory computer-readable storage medium according to claim 8, wherein the program causes the information processing device to execute generating the second video by combining at least a part of each of the two or more of the first videos.

10. The non-transitory computer-readable storage medium according to claim 8, wherein the program further causes the information processing device to execute acquiring information indicating a capturing situation at a time of capturing of the first video, preferentially selecting two or more of the first videos having a similar capturing situation from the plurality of the first videos, and generating the second video using the selected two or more of the first videos.

11. The non-transitory computer-readable storage medium according to claim 10, wherein the capturing situation includes at least one of a time zone, a season, weather, and a speed of the vehicle at the time of capturing.

12. The non-transitory computer-readable storage medium according to claim 8, wherein the program further causes the information processing device to execute:

determining a plurality of candidate routes from a departure place to a destination, the plurality of candidate routes being different each other;

sending candidate route information to the terminal device, the candidate route information indicating the plurality of the candidate routes; and when a request including a specification of one of the candidate routes selected from the plurality of candidate routes is received from the terminal device, determining the one of the candidate routes as the specific route.

13. The non-transitory computer-readable storage medium according to claim 12, wherein the candidate route information includes attribute information indicating an attribute of each of the candidate routes.

14. The non transitory computer-readable storage medium according to claim 13, wherein
the attribute of the candidate route includes at least one of a type and number of facilities along the candidate route, presence or absence of a street light, and a type and number of crimes that occurred on the candidate route.

15. An information processing method performed by an information processing system including one or more vehicles and a server configured to communicate with the one or more vehicles, the information processing method comprising:
generating, by each of the one or more vehicles, a first video of a traveling route by capturing an outside scene while traveling;
storing, by the server, a plurality of the first videos generated by the one or more vehicles;
generating, by the server, a second video of a specific route using two or more of the first videos by (i) configuring playback speeds of the first videos such that vehicle speed information of the first videos to be combined is the same, and (ii) combining at least a part of each of the two or more of the first videos, the specific route being different from the traveling route of each of the plurality of the first videos, and
sending, by the server, the second video to a terminal device, wherein
at least one of the one or more vehicles or the server is configured to acquire information indicating a capturing situation at a time of capturing of the first video, the capturing situation includes at least one of a congestion degree of a roadway and a congestion degree of a sidewalk, and
the terminal device is configured to receive the second video and display the second video via a display device to a user.

16. The information processing method according to claim 15, further comprising
generating, by the server, the second video by combining at least a part of each of the two or more of the first videos.

17. The information processing method according to claim 15, further comprising acquiring, by at least one of the vehicle or the server, information indicating a capturing situation at a time of capturing of the first video, wherein
the server preferentially selects two or more of the first videos having a similar capturing situation from the plurality of the first videos and generates the second video using the selected two or more of the first videos.

18. The information processing method according to claim 17, wherein
the capturing situation includes at least one of a time zone, a season, weather, and a speed of the vehicle at the time of capturing.

19. The information processing method according to claim 15, further comprising:
determining, by the server, a plurality of candidate routes from a departure place to a destination, the plurality of candidate routes being different each other;
sending, by the server, candidate route information to the terminal device, the candidate route information indicating the plurality of the candidate routes; and
when a request including a specification of one of the candidate routes selected from the plurality of candidate routes is received from the terminal device, determining, by the server, the one of the candidate routes as the specific route.

20. The information processing method according to claim 19, wherein
the candidate route in nation includes attribute information indicating an attribute of each of the candidate routes.

21. The information processing method according to claim 20, wherein
the attribute of the candidate route includes at least one of a type and number of facilities along the candidate route, presence or absence of a street light, and a type and number of crimes that occurred on the candidate route.

* * * * *